June 30, 1970  J. E. BIEGEL  3,517,551

TENSILE TEST DEVICE

Filed April 30, 1968  2 Sheets-Sheet 1

INVENTOR.
JOHN E. BIEGEL

BY

ATTORNEY

June 30, 1970  J. E. BIEGEL  3,517,551

TENSILE TEST DEVICE

Filed April 30, 1968  2 Sheets-Sheet 2

*INVENTOR.*
JOHN E. BIEGEL.

BY

ATTORNEY

United States Patent Office 3,517,551
Patented June 30, 1970

3,517,551
TENSILE TEST DEVICE
John E. Biegel, R.D. 2, Manlius, N.Y. 13104
Filed Apr. 30, 1968, Ser. No. 725,470
Int. Cl. G01n 3/10
U.S. Cl. 73—97                                    7 Claims

ABSTRACT OF THE DISCLOSURE

Tensile strength testing apparatus for testing specimens subjected to tensile stress alone or tensile strength while subjected to compressive forces the apparatus comprising a solid block having a test specimen bore to receive a dumbbell-shaped test specimen, and an intersecting bore adapted to receive a blank cartridge, a bolt and firing pin, the test bore being connected to a piezo crystal pressure transducer, and an oscilloscope capable of calibration. The test specimen bore may be threaded at one end to receive and anchor a threaded end of the test specimen, and the bore may be stepped in diameter to provide a smaller vented bore for the testing of a stepped test specimen, with the test portion in the smaller vented bore.

---

This invention relates to the testing of materials for tensile strength alone and while subjected to high compressive stress about the test section.

In the usual testing of materials for tensile strength, test specimens having a section of reduced cross secttion for testing, have had the specimen ends mounted in clamping devices, through which the tensile stress is applied to the specimen. Such procedure requires the clamping of the members in the test apparatus, usually a time consuming manual operation. In addition difficulty is had in assuring that no bending or twisting moments are introduced by the clamping means. Further, such tests have usually been conducted while the test section is exposed to atmospheric pressure, and not while the specimen is subjected to compressive forces in the immediate space surrounding the test section.

The present invention is directed to tensile testing wherein the form of the specimen and test device provide the holding and loading features necessary to provide a uniaxial tensile load which may or may not be superimposed on a hydrostatic pressure applied to the test section. More particularly the concept utilizes a test specimen which comprises a test section disposed between pistons integral with the specimen, one of which may be fixed in the bore or chamber, and which specimens are disposed in a close fitting bore to which hydrostatic test pressures are applied and measured while observing the elongation of the test section. Through the use of a stepped bore the hydrostatic pressure may be applied to a portion of the test specimen isolated from the test section of the specimen. The hydrostatic pressure may be applied by a ram, or through the use of blank cartridges, whereby the tests may be effected in a fraction of a second.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 3:
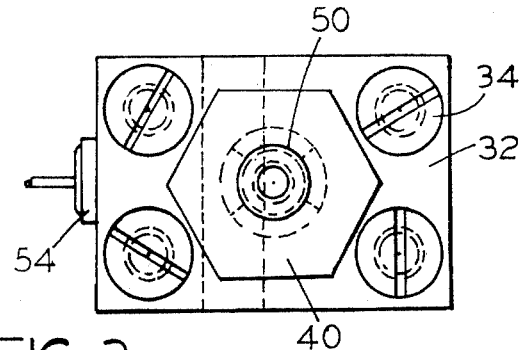
FIG. 3 is a plan view of the device.
Figure 4:
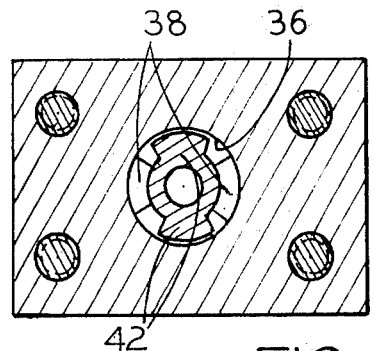
FIG. 4 is a sectional view taken on the line 4—4 of FIG. 1.
Figure 1:
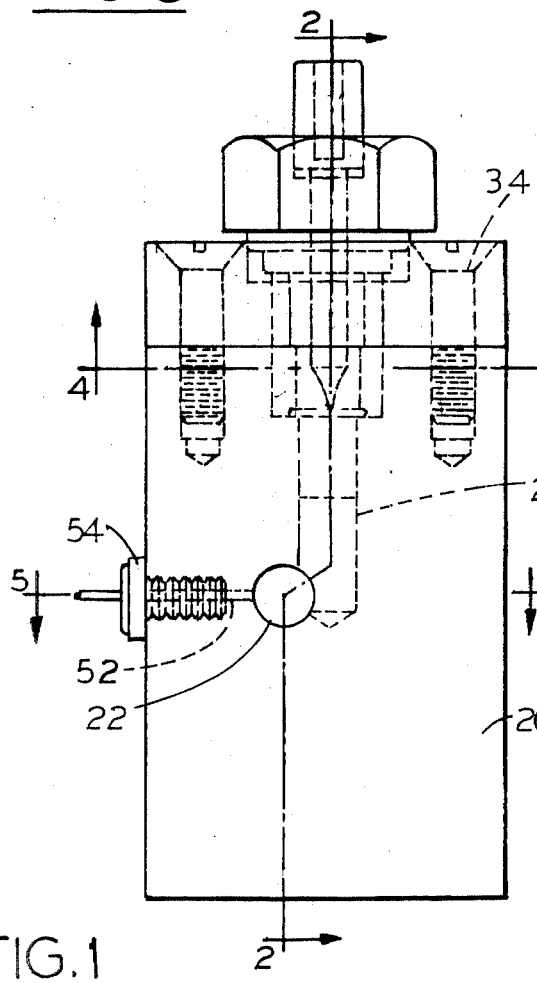
FIG. 1 is a side elevation of the test device.

Referring to the drawings in FIGS. 1–4, there is shown a heavy block 20 of steel or the like, having a test bore 22 which is cylindrical. Intersecting the test bore, to one side, is a vertical bore 24 having a step or shoulder 26 and enlarging in diameter as indicated at 28. The length and diameter of the bore 24 is such as to accommodate a blank cartridge 30 having a suitable charge, with its rim seated on the shoulder 26. The upper end of the block is provided with a heavy cover plate 32 secured to the end of the block 20 by heavy cap screws 34. The cover plate is provided with an aperture 36 having heavy arcuate internal lands 38 adapted to cooperate with a bolt 40 having complemental external arcuate lands 42, which when rotated 90 degrees, provides a bayonet type anchorage for the bolt, the dimensions being such that when in anchored position, the end 44 provides a snug fit over the end of the cartridge shell 30. A firing pin 46, having a detonating pin end 49 is slidably disposed in the bore 48 of the bolt 40, the firing pin having a head 50, which can be struck with a suitable hammer.

The bore 22 is provided with a passage 52 leading to a pressure transducer 54 of the piezo crystal type for recording the pressure within the bore. In practice, a specimen 56 having a test section, of reduced diameter 58, and piston like ends 60 and 62 is disposed in the bore 22. The bore 24 and space or chamber between the piston like ends is then supplied with sufficient oil or other hydraulic fluid, a cartridge placed in the barrel 24, after which the bolt is set in place and turned 90° from the position shown in FIG. 4. The device may be placed in a bucket of sand to protect against loss of the test specimen end portion should the test pressure produce a rupture. The oil or other liquid employed will preferably be of such a viscosity as to not readily leak around the piston like ends of the test specimen during preparing for the test.

The transducer may be connected to an oscilloscope, which may also have a high frequency timer associated therewith to produce time traces, so that a curve of pressure with increments of time will be produced on the scope when the test is made. The entire test requires the brief set up time and almost instantaneous firing time.

Figure 5:
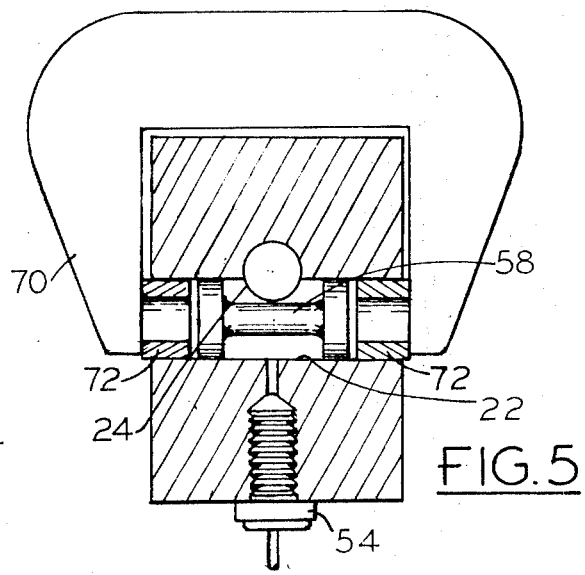
FIG. 5 is a sectional view taken on the line 5—5 of FIG. 1, with clamp limiting means added.

If it is desired to limit the elongation so as not to rupture the specimen, a heavy clamp such as 70, in FIG. 5, may be disposed with its arms extending over the ends of the bore 22. By inserting slugs such as 72 of suitable length, elongation can be held to a maximum permissible as desired.

Figure 2:
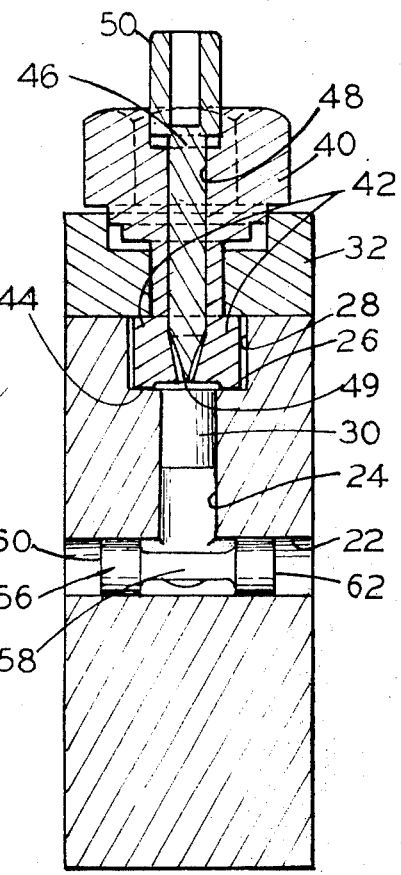
FIG. 2 is a sectional view of the device taken on the broken line 2—2 of FIG. 1.
Figure 6:
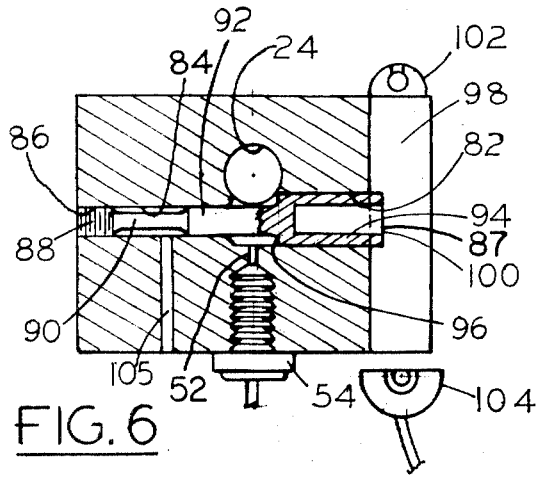
FIG. 6 is a sectional view through a device, the test bore of which is adapted to receive a specimen for axial tensile test and adapted to measure elongation.

It will be appreciated that in the tests effected upon the specimens as shown in FIGS. 2 and 5, the specimen is subject to elongation simultaneous with application of compressive forces upon the test specimen. In FIG. 6, there is shown a test specimen and apparatus for tensile testing of a specimen without subjecting the specimen to the compressive or hydrostatic force of the hydraulic medium. In this arrangement the bore 80 of the block is provided with a stepped bore having large and small diameter sections 82 and 84 respectively and the end of the bore 84 is provided with internal threads 86. The test specimen 87 is provided with a threaded end 88 for screw threaded engagement in the internal threads 86, a necked down portion 90 to be subjected to test, a cylindrical portion 92 making a close fit in the bore 84, and an enlarged cylindrical portion 94 providing an annular piston shoulder 96. The block is provided with a transverse light slot 98 into which the end 100 of the specimen projects. The light slot is provided with illumination at one end as at 102, and a photocell 104 at the other responsive to the cut off of the light beam as the specimen elongates. The photocell, and the pressure transducer can be connected to an oscilloscope to plot pressure against elongation. The small section of the bore 84 is provided with a vent 105, to maintain atmospheric pressure on the test portion of the specimen. The bore 82 is connected to the cartridge bore 24 as heretofore, and to the transducer 54 as by the bore 52.

Figure 7:
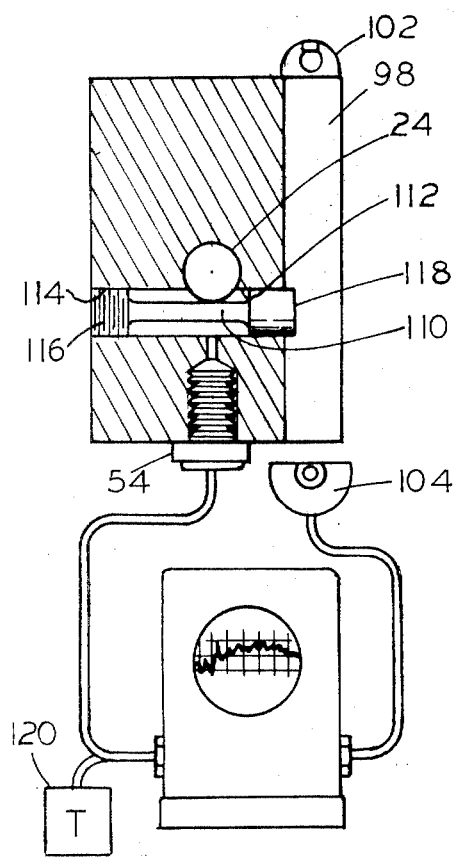
FIG. 7 is a sectional view through a device showing the test bore adapted to receive a specimen for axial tensile test while subjected to hydrostatic pressure, and adapted to measure elongation.

In FIG. 7, the block is adapted to measure pressure against elongation, while the necked down portion 110 of the test specimen is subjected to the elongation pressure. As shown the bore 112 is threaded internally as at 114 at one end, and the test specimen is provided with a threaded end 116 for anchorage. The test specimen has a cylindrical piston portion 118, the end of which extends into the light slot 98, which is provided with illumination 102 at one end and a light cell 104 at the other. The cartridge bore 24 intersects the bore 112 between the threaded end 116 and piston portion 118 of the specimen, and the pressure chamber thus formed connects with the transducer 54.

Figure 8:
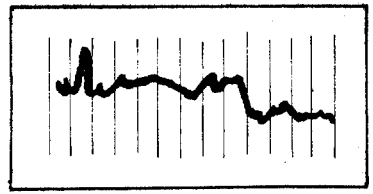
FIGS. 8, 9 and 10 are representative traces secured on an oscilloscope of several tests.
Figure 9:
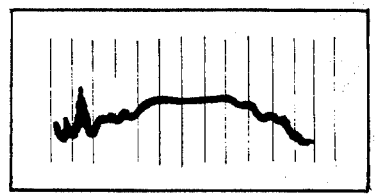
Figure 10:
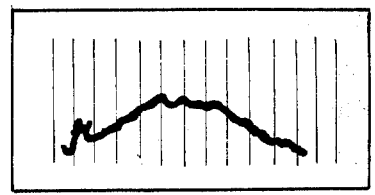

In FIGS. 8, 9 and 10 are typical oscilloscope curves produced during the test. In FIG. 8 there is shown an oscilloscope trace or curve of pressure plotted against time, marks in the form of vertical traces being supplied by a timer 120.

In FIG. 9, there is shown a curve of pressure against time wherein the elongation is limited by a C clamp arrangement as in FIG. 5, and in FIG. 10 there is shown a pressure time test of a high strength piece of steel such as drill rod.

In practice the specimen and the specimen chamber are matched so that the pressure is retained in the pressure chamber long enough to do the necessary work. The pressure may be generated rapidly or slowly; it may be introduced to the gage section or the piston end of the specimen very slowly or very rapidly. By controlling the manner of the introduction of the pressure and its rate of increase or decrease it is possible to provide an infinite variety of stress states on the gage section of the specimen. The pressure may be a short time pressure pulse such as would be generated by an explosive media or a very slow rise in pressure such as derived from an hydraulic pump.

Experiments with the device shown in FIGS. 1–5, or modified as shown in FIG. 7, operate successfully when the pressure is generated by detonating a piston cartridge and with air and oil as pressure transmitting media. Specimens have been fractured when the gage section is one-thirteenth the pressure area of the piston, the hydrostatic pressure being 1/13 of the tensile stress, as well as where the gage section is approximately ⅖ the pressure area of the piston. Specimens of various configurations of steel, copper and yellow brass may be fractured with and without stress concentration notches.

It will be seen that the invention has features not present in other tensile test systems such as the specimen acting as its own loading device, the specimen being capable of being loaded at an infinite number of rates, thus providing an infinite number of strain rates for the test, and of being exposed to an infinite variety of stress systems during the test. Additionally the test system is physically very small operating upon relatively small test specimens.

While several forms of the invention have been illustrated and described, it is to be understood that the invention is not limited thereto. As various changes in the construction and arrangement and procedure may be made without departing from the spirit of the invention, as will be apparent to those skilled in the art, reference will be had to the appended claims for a definition of the limits of the invention.

What is claimed is:

1. In a tensile strength testing apparatus, a test block having a cylindrical bore, adapted to receive a test specimen having a reduced diameter test section, means including a lateral bore for applying a hydraulic testing pressure to the cylindrical bore, and for applying axial hydraulic pressure to an enlarged diameter portion of a test specimen in the cylindrical bore on one side of the test section, means for opposing said pressure disposed on the other side of the test section, and means for measuring the testing pressure applied to the cylindrical bore.

2. A tensile strength testing apparatus according to claim 1 wherein the cylindrical bore is of uniform diameter and includes a test specimen comprising integral end piston like portions spaced by the test section, and the specimen, when in the cylindrical bore, defines an annular chamber, and the testing pressure means comprises a second bore communicating with the chamber.

3. A tensile strength testing apparatus according to claim 1 wherein the means for opposing the pressure comprises an internally threaded section of the cylindrical bore at one end and adapted to receive the externally threaded end of a test specimen.

4. A tensile strength testing apparatus according to claim 3 wherein the opposing means comprises an internally threaded section of the cylindrical bore at one end, of lesser diameter than the bore adjacent thereto and the bore is enlarged in diameter at the other end, whereby to receive a test specimen having an end adapted to be threaded in the threaded bore end, an adjacent test section of reduced diameter, an intermediate section of a diameter substantially that of the unenlarged bore section, and a piston like end section adapted to be disposed in the enlarged bore section, and to define a chamber, and the testing pressure means comprises a second bore communicating with the chamber.

5. A tensile strength testing apparatus according to claim 4 wherein the unenlarged bore section is provided with an atmospheric vent.

6. A tensile strength testing appaartus according to claim 3, wherein the block is provided with a slot extending transversely of and through the cylindrical bore at its other end for exposing the end of a test specimen to observe elongation.

7. A tensile strength testing apparatus according to claim 1 wherein the second bore is adapted to receive a blank cartridge and is provided with a removable bolt and firing pin.

References Cited

UNITED STATES PATENTS 3,277,693 10/1966 D'Amato et al. _____ 73—95 X
3,408,852 11/1968 Marvin _____ 73—12

FOREIGN PATENTS 552,993 5/1943 Great Britain.

JERRY W. MYRACLE, Primary Examiner

U.S. Cl. X.R.

73—12